UNITED STATES PATENT OFFICE.

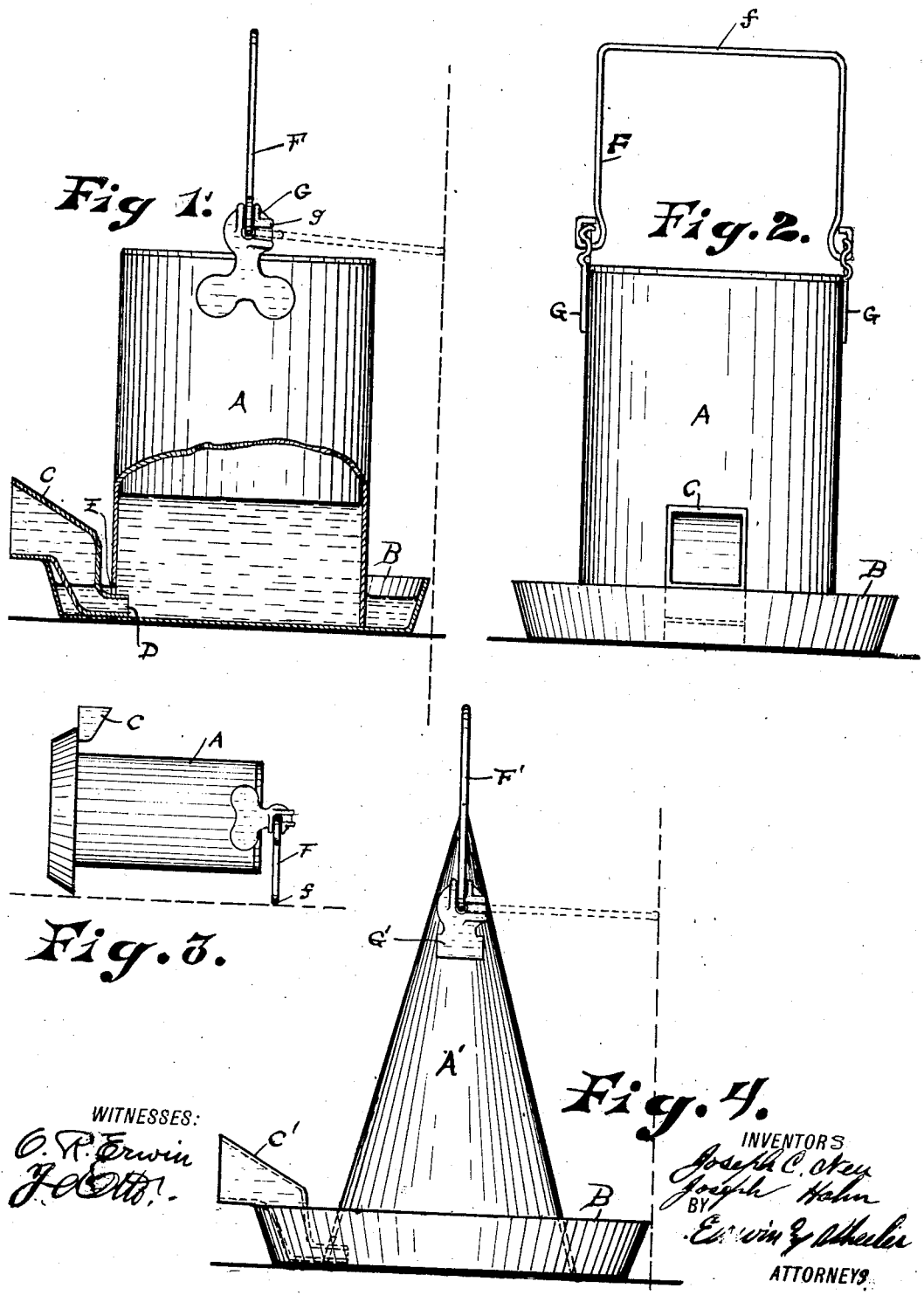

JOSEPH C. NEU, OF NORTH LAKE, AND JOSEPH HAHN, OF MILWAUKEE, WISCONSIN.

DRINKING-FOUNTAIN FOR CHICKENS.

No. 835,551.  Specification of Letters Patent.  Patented Nov. 13, 1906.

Application filed February 26, 1906. Serial No. 302,865.

*To all whom it may concern:*

Be it known that we, JOSEPH C. NEU, residing at North Lake, county of Waukesha, and JOSEPH HAHN, residing at Milwaukee, county of Milwaukee, State of Wisconsin, citizens of the United States, have invented new and useful Improvements in Drinking-Fountains for Chickens, of which the following is a specification.

Our invention relates to improvements in drinking-fountains for chickens or other fowl, and pertains especially to that class of devices in which a supply of water from a storage-tank is automatically fed to an exposed trough or pan in a manner to keep a small supply of water constantly exposed.

The object of our invention is to provide means for refilling such a storage-tank in a manner to avoid leakage of either air or water through the refilling-aperture.

A further object of the invention is to improve the structure in certain details hereinafter described.

In the following description reference is had to the accompanying drawings, in which—

Figure 1 is a side view of our invention with the lower portion partially broken away in vertical central section. Fig. 2 is an elevation drawn at right angles to Fig. 1. Fig. 3 illustrates the position of the device when the storage-tank is being refilled. Fig. 4 is an elevation illustrating a modified form of construction.

Like parts are identified by the same reference characters throughout the several views.

A is the storage-tank provided with an annular trough B at its lower end. The tank is provided with a funnel C, extending outward laterally over the edge of the trough and downwardly and inwardly through the wall of the tank A, discharging into the tank at D. The tank is provided with an aperture E directly over the funnel C, where it passes through the tank-wall, whereby the water is permitted to flow from the tank outwardly into the trough B until the aperture E is covered by the liquid in the trough, whereupon the aperture will be sealed until the water in the trough B is lowered sufficiently to permit air to enter the tank A through the aperture E. When it is desired to refill the tank, the latter is swung downwardly to the position in which it is shown in Fig. 3, with the funnel C projecting upwardly. The tank may be supported in this position by a bail F, pivoted to suitable ears G on the tank and provided with a cross-bar *f*, which serves as a handle for carrying the tank and also serves as a rest to support the tank in the position in which it is shown in Fig. 3, the bail being swung downwardly to a position substantially at right angles to the top of the tank for this purpose. The ears G are preferably provided with fluted projections *g*, over one of which the bail passes resiliently in swinging to its position in Fig. 3, whereby the tank will be supported with sufficient stability in that position.

Referring to Fig. 4, it will be observed that the construction is the same as that shown in the other views, with the exception that the storage-tank A in this view is conical and the ears G' are attached to the tank at an intermediate point. The handle F' and funnel C' are substantially the same in construction and arrangement. By using a conical storage-tank the chickens are prevented from roosting on the tank.

Having thus described our invention, what we claim as new, and desire to secure by Letters Patent, is—

1. In a device of the described class, the combination of a storage-tank; a trough connected with the base thereof and communicating with the interior of the tank through an aperture in its wall; and a funnel having its delivery end extended through said aperture; said funnel being arranged to extend upwardly and outwardly over the edge of the trough.

2. The combination of a storage-tank; an annular trough at the base of said tank communicating with the interior of the tank through an aperture in one of its walls; a funnel extending through said aperture into the tank, and from said aperture upwardly and outwardly over the edge of the trough and having a receiving-aperture substantially in a vertical plane when the tank is in normal position.

3. In a device of the described class, the combination of a storage-tank; a trough connected with the base thereof and communicating with the interior of the tank through an aperture in its wall; and a funnel having its delivery end extended through said aperture; said funnel being arranged to extend upwardly and outwardly over the edge of the trough; together with means for supporting the tank substantially in a horizontal position with the mouth of the funnel opening upwardly.

4. The combination of storage-tank; an annular trough at the base of said tank communicating with the interior of the tank through an aperture in one of its walls; a funnel extending through said aperture into the tank and from said aperture upwardly and outwardly over the edge of the trough, and having a receiving-aperture substantially in a vertical plane when the tank is in normal position; together with a bail pivotally connected with the tank and adapted to serve as a rest for the upper end of the tank when the bail and tank are swung downwardly at right angles to the normal axial line.

5. In a device of the described class, the combination of a conical tank having downwardly-diverging walls, apertured near their lower ends; a trough at the base of said walls communicating with the interior of the tank through said aperture; a funnel having one end extending through the wall of the tank within the trough, and the receiving end extending upwardly and outwardly over the edge of the trough; and a rest connected with the upper portion of the tank and adapted to extend laterally to a point substantially in the vertical line of the trough on the side opposite the funnel.

In testimony whereof we affix our signatures in the presence of two witnesses.

JOSEPH C. NEU.
JOSEPH HAHN.

Witnesses:
LEVERETT C. WHEELER,
CHAS. B. PERRY.